G. F. DINSMORE.
PROCESS OF PRODUCING POWER FROM PEAT OR OTHER CARBONACEOUS MATTER.
APPLICATION FILED MAY 24, 1909. RENEWED NOV. 5, 1914.
1,197,456.
Patented Sept. 5, 1916.
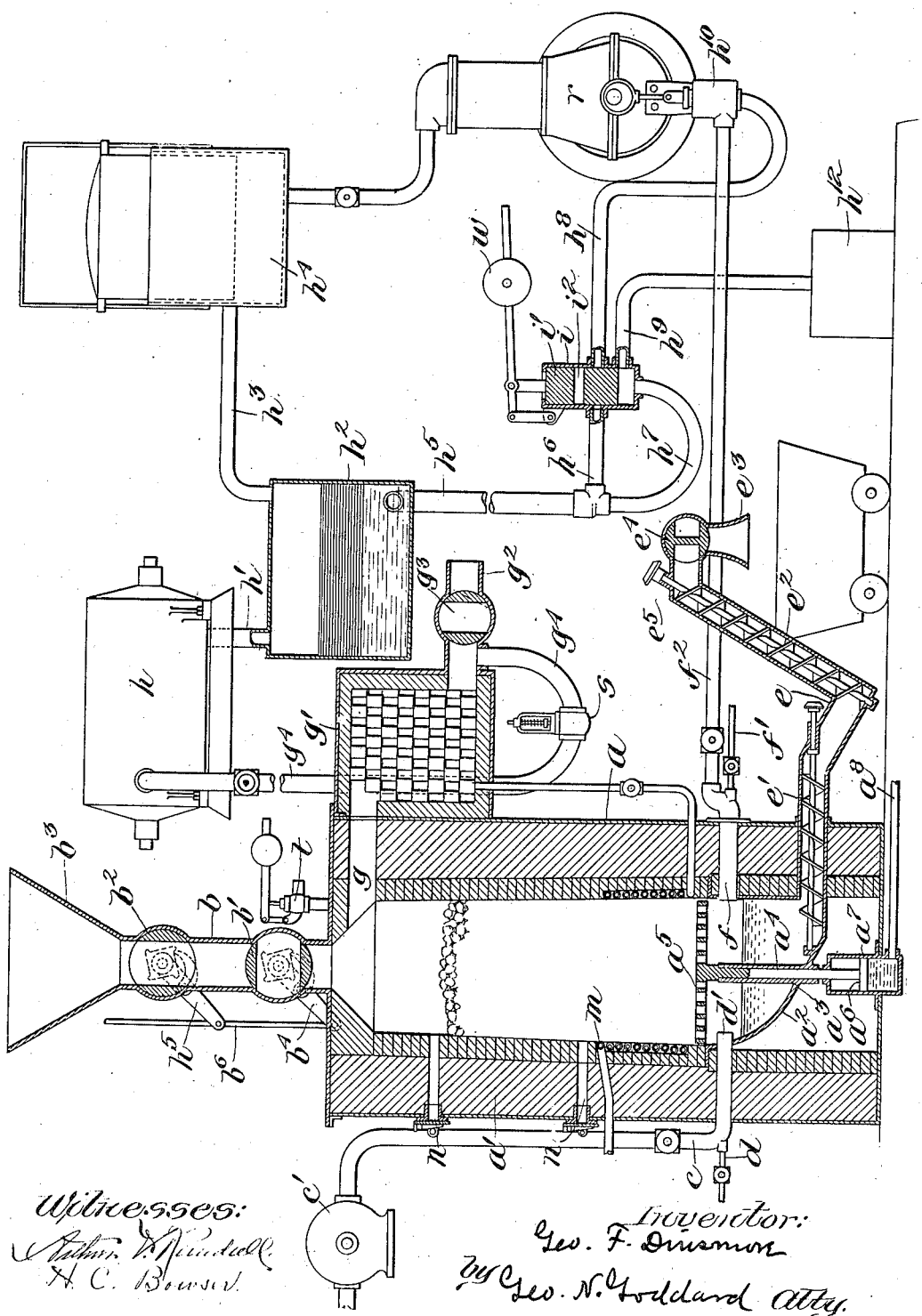

UNITED STATES PATENT OFFICE.

GEORGE F. DINSMORE, OF BOSTON, MASSACHUSETTS, ASSIGNOR TO DINSMORE POWER PROCESS COMPANY, A CORPORATION OF MAINE.

PROCESS OF PRODUCING POWER FROM PEAT OR OTHER CARBONACEOUS MATTER.

1,197,456.      Specification of Letters Patent.      Patented Sept. 5, 1916.

Application filed May 24, 1909, Serial No. 498,061.    Renewed November 5, 1914. Serial No. 870,536.

*To all whom it may concern:*

Be it known that I, GEORGE F. DINSMORE, citizen of the United States, and resident of Boston, county of Suffolk, Massachusetts, have invented certain new and useful Improvements in Processes of Producing Power from Peat or other Carbonaceous Matter, of which the following is a specification.

This invention relates to the production of power and has for its object production of power by the economic utilization of raw peat or other carbonaceous material containing a large percentage of moisture.

Although large deposits of peat are found in widely distributed localities yet the use of peat for fuel in producing power on a commercial scale has not been generally successful, chiefly on account of the relatively high cost of preparing peat for use as fuel, since the drying and briqueting commonly resorted to under most conditions involve a prohibitive expense.

I have discovered a method of utilizing peat or other wet carbonaceous material by which preliminary drying and briqueting may be entirely dispensed with, which consists in converting the moisture and the combustible content of said peat directly into steam and gas under pressure in a pressure-tight combustion chamber, thus producing a motive fluid of mingled steam and gas under pressure that is available for the purpose of driving a pressure engine. Usually raw peat, after its removal from the bog, contains much more than sufficient combustible content to convert its moisture content into steam under working pressure, under the conditions hereinafter set forth, hence there is a surplus quantity of heat units which may be utilized either by the conversion of additional supplies of water into steam, or by so regulating the combustion that a portion of the carbonaceous content is converted into CO instead of being completely burned, thus producing a combustible producer gas available for use in gas engines.

By the direct conversion of the moisture content into steam in the combustion chamber and the passing of the entire products of combustion mingled with the steam through the pressure engine, I effect substantial economies in preventing heat losses heretofore encountered in steam boiler practice through radiation, flue gases, and loss of heat transmitted through the boiler tubes. By reason of the fact that the water to be evaporated is finely distributed throughout the porous or cellular mass of the peat, which is exposed directly to the heat of the combustion gases in the generator, there is provided an enormous evaporating surface which greatly increases the efficiency and rapidity of the evaporation of the moisture.

While the invention herein claimed consists only in the process by which production of power and the utilization of wet carbonaceous material is effected, I have, for the sake of clearness, illustrated in a more or less conventional and diagrammatic manner an apparatus intended for use in carrying out the process, but it will be understood that the apparatus herein shown is simply illustrative and conventional, and that material changes may be made in the form, construction, and arrangement of the apparatus shown.

In the practice of this invention I employ an iron or steel shell $a$, capable of sustaining substantial internal pressure, whose interior is lined with a thick layer of fire clay or fire brick $a'$ to prevent loss of heat. In the lower portion of said stack is mounted a heavy iron ash pit $a^2$ provided with a central vertical passage $a^3$ adapted to receive a reciprocating plunger $a^4$ on the top of which is mounted a heavy grate $a^5$. The lower end of the plunger $a^4$ is provided with a piston $a^6$ working in a cylinder $a^7$ by hydraulic pressure supplied through the pressure pipe $a^8$ from a suitable source of pressure or hydraulic pump not shown.

The inner wall of the generator is preferably slightly converged from bottom to top for reasons hereinafter explained. At the top of the generator is arranged an inlet or feed pipe $b$ controlled by double pressure-tight valves $b'$ $b^2$ and terminating at its upper end in a large funnel-shaped receiver $b^3$. Any suitable mechanism may be employed for operating these inlet valves $b'$ $b^2$ and I have illustrated conventionally for that purpose, levers $b^4$ $b^5$ operated by a movable actuating rod $b^6$, the only requirement being that one or the other of said valves shall always remain closed while the apparatus is in use. Below the grate I provide an air inlet pipe $c$ through which compressed air from an air compressor $c'$ is supplied to the interior of the generator. Connecting with the compressed air pipe $c$ is a steam inlet pipe $d$ which delivers steam into the interior through the steam nozzle $d'$ by which the compressed air is admitted.

The ash pit is kept pressure tight by a water seal, any suitable appliances being used for removing the ashes therefrom without losing the pressure. In this case I have shown for that purpose a laterally extending and upwardly inclined passage $e$ to which are fitted helical conveyers $e'$ $e^2$ which conduct the ashes to the offtake spout $e^3$ which is controlled by a revolving pressure-tight valve $e^4$ which is provided with pockets for carrying away a given quantity of ashes at each revolution. An air pressure pipe $e^5$ serves to maintain a constant pressure on the top of the water seal. On the opposite side of the ash pit $a^2$ is another inlet nozzle $f$ to which may be supplied by pipe $f'$, compressed air and by pipe $f^2$ the combustible constituents recovered from the offtake gases and vapors coming from the generator through the steam turbine. Near the top of the stack is provided a large offtake passage or port $g$ through which the mingled gas and steam pass into a supplemental equalizing chamber $g'$, which is preferably, as shown, filled with a cobwork construction, preferably of metal, which serves the two-fold purpose of thoroughly mingling the gas and steam and making them homogeneous as to temperature, and also serves to form a sort of expansion or pressure-equalizing chamber or reservoir between the generator and the turbine $h$ through which the gaseous mass is passed in order to convert the pressure into kinetic energy. The offtake or exhaust pipe $h'$ in the steam turbine $h$ leads to a condenser tank $h^2$ from the top of which is a gas offtake pipe $h^3$ leading to a gas holder $h^4$, while from the lower part of said condenser tank is an outlet pipe $h^5$ for drawing off the liquid contents of the tank.

Inasmuch as the light hydrocarbon vapors when condensed will float on the water, being of considerably less specific gravity than the water, the separation of the light hydrocarbon liquids from the water may be accomplished by a suitable differential pressure device such as I have shown in the drawings. To this end the pipe $h^5$ is divided into two branches $h^6$, $h^7$, one of which enters the lateral wall of the piston or valve cylinder $i$, the other of which enters the bottom of said cylinder or valve casing. In this casing $i$ is mounted an elongated reciprocating piston or valve $i'$ provided with a transverse passage $i^2$. When the valve is at its lowermost position, this transverse passage $i^2$ comes directly opposite the inlet pipe $h^6$ and the outlet pipe $h^8$. In this position of the valve the outlet pipe $h^9$ is closed, hence the liquid flowing down through pipe $h^5$ and $h^6$ passes through the port $i^2$ into offtake pipe $h^8$. The valve $i'$ is provided with an adjustable weight or tension device tending to depress the same with a certain ascertained amount of force or pressure which is greater than the pressure that would be exerted on the bottom of the piston or valve $i'$ in case the long offtake pipe $h^5$ should be filled with the light hydrocarbon liquid but is less than the upward pressure that would be exerted against the bottom of the valve $i'$ when the pipe $h^5$ is filled with water. This can be easily accomplished by adjusting the weight or controlling device by which the downward pressure on the valve is determined or regulated.

Let us suppose that the water line in the tank $h^2$ is above the outlet pipe $h^5$. In that case the pipe would be filled with water and the pressure exerted by the column of water therein will be sufficient to raise and maintain the valve $i'$ in position to open the passage into the outlet pipe $h^9$ and to close the passage into the outlet pipe $h^8$. This condition will continue until the water ceases to flow through the outlet pipe and the hydrocarbon liquid runs into the said pipe. When the pipe has become filled or partly filled with the liquid hydrocarbon, the pressure of the column therein will be insufficient to sustain the valve $i'$ against the downward pressure, hence the valve will descend, closing the offtake pipe $h^9$ and opening the passage to offtake pipe $h^8$. By offtake pipe $h^8$ the hydrocarbon liquid may be carried away to any suitable receiver or it may be led to a force pump $h^{10}$ by which it is injected through pipe $f^2$ and injector $f$ back beneath the grate in the generator, to be there burned. On the other hand the hot water from the condenser tank $h^2$ is carried off to a hot water well or tank $h^{12}$.

In starting the process in operation, the fire is kindled in the grate and maintained for a sufficient length of time by the supply of abundant quantities of dry fuel until the generator becomes thoroughly heated and a large mass of carbonaceous material is maintained at incandescence, the compressed air blast supplying air for the purpose of maintaining the necessary combustion to bring about these conditions. During that period, the offtake gases of combustion pass through the supplemented chamber $g'$ so as to thoroughly heat the chamber and make their exit through the vent pipe $g^2$. When the generator has become thoroughly heated and the large mass of carbon has been brought to the incandescent state for a considerable depth above the grate, I then begin to discharge into the funnel $b^3$ wet carbonaceous matter such as peat dredged directly from the bog, without intermediate drying out or briqueting. At this time the opening $g^3$ is tightly closed and the valve controlling the offtake pipe $g^4$ leading to the turbine is opened to supply the mingled steam and gas to the turbine. At the same time through the nozzle $d'$ is injected a supply of compressed air and steam, which passes up through the incandescent mass above the grate, resulting in the production of combined water gas and producer gas, the steam being disassociated to produce carbon-monoxid and hydrogen in the presence of the incandescent coal and the carbon-dioxid produced by the combustion of the lower layers of coal with the air being transformed into carbon-monoxid by passing through the upper incandescent layers. As before stated the generator is pressure tight, it being intended to maintain a pressure of say about thirty pounds, more or less, above atmospheric pressure.

The intense heat of combustion acts to convert the moisture in the freshly fed peat into steam, while this conversion of the water into steam results in lowering the very high temperature of the combustion gases so that the mingled steam and gas passing through the offtake pipe are sufficiently reduced in temperature to permit their being used directly in the turbine. As fast as the moisture in the peat becomes converted into steam, the peat itself becomes incandescent and as fresh supplies of it are added continually the process becomes continuous.

The process should be so operated that the top of the incandescent mass is maintained at practically a uniform level so that a good balance may be maintained by supplying continually wet peat above the line of combustion in order to maintain the continuous and practically instantaneous generation of steam in large quanities and in order to temper the heat of the offtake gases so that their temperature will not rise to the point where it will be injurious to the turbine in which it is used.

Since there is a very substantial surplus of heat energy in excess of that required to convert the moisture content of the raw peat into steam at working pressure, I may utilize a portion of such excess heat through the agency of a steam generator, or superheating coil $m$, such as is described in my patent reissued March 27, 1898, No. 11,656, said coil being arranged in an annular recess above the normal grate lever. The steam, or water supply to this coil $m$ enters at the top and passes out at the lower end, whence it is conducted into the off-take passage leading to the turbine at any suitable point, such, for example, as at the supplementary chamber $g'$, there to be mingled with the compound motive fluid of gas and steam which is generated in the generator. This acts to reduce somewhat the exceedingly high temperature that would prevail otherwise at this part of the generator besides acting to super-heat the steam produced in the generator before it passes into the turbine $h$, and also increases somewhat the volume of steam mingled with the combustion gases available for use in the pressure engine or turbine. The rate of combustion may be regulated by controlling the supply of compressed air injected into the generator while the water gas content carrying free hydrogen can be controlled by regulating the supply of steam injected directly into the generator.

In practice, this process will result in the rapid production of large volumes of steam and combustible gases and a comparatively moderate pressure which is utilized first in the turbine, and second by carrying over the fixed gases from the condenser to be burned in an internal combustion engine $r$, or otherwise used, while any condensible hydro-carbons are separated from the hot water of condensation as already described. As fast as the lower portion of the incandescent mass of fuel is consumed the ashes may be expelled into the ash pit and the remaining incandescent mass continually settles down toward the grate, which action may be assisted by forcing the grate upward under hydraulic pressure and again dropping it, whereby the ashes are caused to fall in the ash pit while the remaining incandescent mass of fuel is compressed between the superincumbent weight of fresh peat in the upper part of the stack and the upwardly moving grate. The diameter of the generator may be slightly larger at the bottom of the generator than at the top to facilitate the lowering of the whole mass by gravity.

By the above described process, the generator forms in effect an internal combustion and direct acting boiler in which steam and combustion gases are generated together without appreciable loss. The thicker, or heavier, constituents of the gaseous product will, for the most part, be retained in the superincumbent mass of peat through which the gas has to make its way to the off-take, and is thereafter carried down to a lower level where it is burned as part of the fuel supply. The large mass of steam which is condensed after passing through the turbine carries with it the other condensible constituents of the gas which may be separated in the manner above described, the hot water from the condensed steam being available for heating water or for other purposes.

Since in raw or wet peat there is an excess of carbon over the amount necessary to convert moisture content into steam, the process can be maintained continually for an indefinite period, and thus I get entirely rid of the expensive and hitherto indispensable drying-out and treatment of the wet peat, and, therefore, the presence of the water in the peat becomes an asset in the economical production of power.

The pressure under which the process is carried on will vary considerably according to conditions desired. It must, on the one hand, be sufficient to maintain any desired form of pressure engine in effective operation, while, on the other hand, it will probably not be advantageous in practice to carry the pressure to the maximum sometimes used in steam engineering on account of the necessity of compressing the air introduced up to, or above, the pressure maintained in the generator. For practical purposes, satisfactory results would be obtained with generator pressures ranging thirty pounds gage pressure upward to say one hundred pounds. The relative proportion of fixed gas and steam which comprise the motive fluid will, of course, depend not only upon the chemical constituents and the raw material or carbonaceous matter and the moisture content which it carries with it, but also, obviously, upon the completeness or incompleteness of the combustion of fuel in the generator.

When it is desired to convert as large a portion of the peat as possible into combustible gas, the supply of air would be so regulated as to produce only so much $CO_2$ as may be required to produce sufficient heat to maintain the complete evaporation of the moisture content at the desired gage pressure, the remainder of the carbonaceous content being burned to CO. On the other hand, it would be possible by burning the entire combustible content of the peat as completely as possible to generate a much greater quantity of heat in the generator which would result in the off-take gas having very few heat units. This surplus heat generated could be utilized for the production of further supplies of steam by the use of steam coils, such as the coil $m$, or otherwise.

Merely for the sake of illustration of the possibilities I give below a chemical analysis of an actual sample of peat taken from a bog near Boston, which is as follows:

*Analysis.*

|  |  | Noncombustible. | Combustible. | B.T.U. |
|---|---|---|---|---|
| Carbon | 9.799 |  | 9.799 | 1420 |
| Hydrogen | 10.709 | 9.334 | 1.375 | 853 |
| Oxygen | 74.671 | 74.671 |  | 138 |
| Nitrogen | .582 | .582 |  |  |
| Sulfur | .035 |  | .035 | 1 |
| Ash | 4.2 | 4.2 |  |  |
|  | 99.996 | 88.787 | 11.209 | 227 4 |
|  |  |  |  | 13 8 |
|  |  |  |  | 2136 |

Moisture............ 84.059
From free hydro.... 12.38
                    ———
                    96.439

Dry peat 15.4% in 1 lb. of fuel. B. T. U. per lb. dry peat=13880.

To determine heat value. Carbon burned to CO, sulfur and hydrogen not burned.

$$.09799 \times 4450 = 435 \text{ B. T. U.}$$

Heat required to evaporate moisture content $.84059 \times 1156.5 = 973$ B. T. U. The burning of all the carbon to CO will not evolve sufficient heat to evaporate all the moisture. If, therefore, we burn .0535 C to $CO_2$ and .04449 C to CO we shall produce sufficient heat to evaporate the moisture to the temperature and pressure of steam at 100 pounds. Heat values being as follows:

$$.0535 \times 4500 = 776 \text{ B. T. U.}$$
$$.04449 \times 4500 = 197 \text{ B. T. U.}$$
$$\overline{973 \text{ B. T. U.}}$$

*Analysis of resultant gas by weight.*

| | | |
|---|---|---|
| Steam | | .84059 |
| Carbon or C to $CO_2$ | | .196 |
| C to CO | | .1038 |
| Nitrogen from air | .672 | |
| Nitrogen free in fuel | .00582 | |
| | .67782 | .67782 |
| Hydrogen | .01375 | |
| Sulfur | .00035 | |
| | 0.01410 | 0.01410 |

Total weight of products of combustion per pound of fuel................................................. 1.83231

*Percentages of constituent parts.*

|  | Per cent by weight. | Cubic feet per pound at 212° F. and atmospheric pressure. | Volume per pound of mixture. | Per cent by volume. |
|---|---|---|---|---|
| Steam | 45.9 | 26.56 | 11.9 | 53.4 |
| CO | 5.65 | 17.4 | .983 | 4.4 |
| $CO_2$ | 10.7 | 11.06 | 1.185 | 55.32 |
| N | 37 | 17.04 | 6.44 | 28.88 |
| H | .73 | 244 | 1.78 | 8 |
| S | .02 |  |  |  |
|  | 100 |  | 22.288 Cubic feet per pound. | 100 |

*After steam is condensed.*

Weight of gas per pound of fuel 1.8323—.8406—.9971.

|   | Per ct. |   |   |   |
|---|---|---|---|---|
| CO | 10.48 | 17.4 | 1.82 | 9.4 |
| CO₂ | 19.7 | 11.06 | 2.18 | 11.3 |
| N | 68.4 | 17.4 | 11.9 | 61.7 |
| H | 1.39 | 244 | 3.39 | 17.6 |
| S |   |   |   |   |
|   | 100 |   | 19.29 | 100 |

Heat value of resultant gas from CO per pound of fuel
.04449×10050............................................. 450
From hyd. per pound of fuel .01375×6200............. 852
Count back for evaporation of water .01375×9×1118...... 138
                                                    ——— ———
                                                    714  714

B. T. U. per pound fuel............................ 1164

1164 and 973=2137 B. T. U. total per pound fuel.

It should be stated that the sample of peat giving the above analysis contains a small quantity of free water which will drain off if the peat is allowed to stand in a drainage tank, even without any preliminary drying, before it is conveyed into the generator. When the wet peat is dredged or pumped into such a drainage tank, I find that the moisture content of the peat taken from the tank, or bin, is approximately 80%, and of course the percentage of combustible content is correspondingly increased.

While I have referred to the process as applied particularly to raw peat deposits, it would be understood that the principles of this invention are applicable to other forms of carbonaceous matter carrying a large moisture content.

Referring again to the drawings, you will notice that sight holes are provided at suitable places on the generator as at $n$ to enable the attendant to inspect the interior. The off-take passage leading to the turbine may be provided with a suitable automatic pressure valve $s$ and the generator itself may be provided with an automatic safety valve as indicated at $t$.

What I claim is:

1. The herein described process of utilizing wet carbonaceous material for power purposes which consists in maintaining a mass of fuel at incandescence in a pressure tight generator, supplying thereto in properly regulated quantities the carbonaceous material impregnated with water, whereby the moisture content is converted into steam under pressure and mingled with the combustion gases, and then passing said mingled gas and steam while under pressure through a pressure engine in order to produce power, substantially as described.

2. The herein described process of utilizing wet peat for power purposes which consists in forcing into a pressure-tight generator containing a burning mass of fuel, properly regulated supplies of the wet peat and of compressed air and converting said wet peat by the combustion heat in said generator directly into fixed gas and steam under pressure and then utilizing the expansive energy of said gas and steam to produce power, substantially as described.

3. The process of utilizing raw or wet peat for power purposes, which consists in converting the moisture content and the combustible content of said peat respectively directly into steam and gas under pressure in a pressure-tight combustion chamber, and converting the expansive force of said mingled steam and gas into kinetic energy by means of a pressure engine, substantially as described.

4. The process of utilizing raw or wet peat for producing power which consists in burning said wet peat in a pressure-tight generator in the presence of the moisture which it contains, so as to produce simultaneously a continuous supply of mingled steam and combustible gas under pressure, then utilizing the potential energy of said gaseous body by successively expanding it through a pressure-engine and burning the combustible gas to produce power, substantially as described.

5. The herein described process which consists in maintaining under pressure a mass of carbonaceous material under incandescence by means of compressed air forced into a pressure-tight generator, supplying thereto fresh carbonaceous matter which carries a relatively larger quantity of water under conditions to convert said carbonaceous matter into combustible gas, and to convert said water into steam, then utilizing said mingled steam and combustible gas to produce kinetic energy by means of a pressure-engine and separating the combustible gas from the steam in the exhaust from said engine by condensation, substantially as described.

6. The herein-described process of utilizing wet peat which consists in simultaneously supplying to a pressure-tight generator containing an incandescent carbonaceous mass properly regulated supplies of compressed air and carbonaceous material which carries a moisture content exceeding in quantity the combustible content of said material, and thereby converting said wet carbonaceous material continuously into a motive fluid comprising steam and combustible gas with sufficient pressure to operate a pressure-engine and recovering the potential energy therefrom by means of a pressure-engine, substantially as described.

7. The process of utilizing wet peat or carbonaceous material for power purposes which consists first in producing an incandescent mass in the pressure-tight combustion chamber by the combustion of relatively dry fuel, then supplying thereto properly regulated supplies of wet peat and compressed air while maintaining the pressure in the combustion chamber and thus converting the moisture content of the peat into steam while burning the carbonaceous content to generate the heat to maintain the process continuously and to produce gaseous products under pressure which mingle with the steam and form a compound motive fluid for use in a pressure-engine.

8. The process of producing power which consists in converting the moisture content and the combustible content of wet carbonaceous material respectively directly into steam and gas under pressure by burning the combustible content in a pressure-tight generator and simultaneously converting the moisture content into steam to produce a compound motive fluid of intermingled steam and gas, applying the surplus heat of combustion to generate or superheat a further supply of steam to be added to the compound motive fluid, thus produced, and thereafter converting the expansive forces of mingled steam and gas into kinetic energy by means of a pressure engine, substantially as described.

In witness whereof, I have subscribed the above specification.

GEORGE F. DINSMORE.

In the presence of—
 GEO. N. GODDARD,
 KATHARINE A. DUGAN.